(12) United States Patent
Gunawardena

(10) Patent No.: US 7,798,059 B2
(45) Date of Patent: Sep. 21, 2010

(54) OVEN WITH IMPROVED STREAM CHAMBER

(75) Inventor: Ramesh M. Gunawardena, Chagrin Falls, OH (US)

(73) Assignee: John Bean Technologies Corporation, Chicago, IL (US)

( * ) Notice: Subject to any disclaimer, the term of this patent is extended or adjusted under 35 U.S.C. 154(b) by 515 days.

(21) Appl. No.: 11/483,908

(22) Filed: Jul. 10, 2006

(65) Prior Publication Data

US 2008/0006258 A1    Jan. 10, 2008

(51) Int. Cl.
A47J 27/16    (2006.01)
A47J 37/00    (2006.01)
(52) U.S. Cl. .............. 99/484; 99/477; 99/475; 99/443 C; 126/21 A; 219/401
(58) Field of Classification Search ........... 99/477, 99/476, 474, 475, 473, 478, 443 C, 443 R, 99/484; 126/21 A, 369, 369.2, 369.1, 20; 219/401, 400
See application file for complete search history.

(56) References Cited

U.S. PATENT DOCUMENTS

| | | | | |
|---|---|---|---|---|
| 3,880,068 A | * | 4/1975 | Goodale | 99/478 |
| 4,363,263 A | * | 12/1982 | Williams | 99/352 |
| 4,409,453 A | * | 10/1983 | Smith | 219/684 |
| 4,873,107 A | * | 10/1989 | Archer | 426/520 |
| 5,072,663 A | * | 12/1991 | Ellis-Brown | 99/331 |
| 5,189,948 A | * | 3/1993 | Liebermann | 99/443 C |
| 5,539,187 A | * | 7/1996 | Smith et al. | 219/681 |
| 5,609,095 A | | 3/1997 | Lemke et al. | |
| 5,741,536 A | * | 4/1998 | Mauer et al. | 426/520 |
| 5,960,703 A | | 10/1999 | Jara et al. | |
| 6,410,066 B1 | | 6/2002 | Weng | |
| 6,494,131 B2 | | 12/2002 | van de Vorst et al. | |
| 6,655,263 B2 | * | 12/2003 | Sakurazawa | 99/330 |
| 2006/0040029 A1 | | 2/2006 | Gunawardena et al. | |

* cited by examiner

Primary Examiner—Reginald L Alexander
(74) Attorney, Agent, or Firm—Pauley Petersen & Erickson

(57) ABSTRACT

A cooking apparatus includes a rapid activation module in communication with a continuous oven. The rapid activation module includes a steam chamber having an inlet and an outlet and a plurality of steam knives disposed at select position within the steam chamber. The steam knives may be selectably adjusted to achieve and maintain a desired level of steam condensation within the steam chamber by isolating a main body of the steam chamber from air and/or vapor infiltration from an associated oven and/or the outside environment.

19 Claims, 4 Drawing Sheets

OVEN WITH IMPROVED STREAM CHAMBER

FIELD OF THE INVENTION

The invention relates to a cooking apparatus including an improved steam chamber for use with a continuous oven that is adaptable to various oven systems, processing treatments and substrates.

BACKGROUND OF THE INVENTION

The performance of an oven is determined by how effectively various heat transfer mechanisms can be delivered for heat treating a work-piece (food item) to produce a unique commercial advantage. In general, different food substrates require very specific processing treatments to deliver the sensory attributes desired by consumers. Food processors strive to deliver these specific food attributes through continuous and repeatable large-scale industrial cooking systems. Such cooking systems may utilize one or more heat treatment steps involving different heat transfer mechanisms to affect the final food item outcome in terms of product quality, flavoring, color development, food safety and/or economic considerations.

Simply applying heat does not necessarily produce the desired food attributes and it is important to understand what brings about various desired attributes. For example, heat processing conditions, sequences and equipment needed for poultry, beef, pork, and bakery items can vary significantly. Flexibility of heat treatments, the timely application of appropriate heat transfer mechanisms and overall equipment and system design are crucial to bringing about the qualities that are inherent and unique to the particular food substrates. Furthermore, food item appeal and texture associated with coatings external to the food substrate are also enhanced through precise control and conditioning of heat delivery.

Current commercial oven systems may utilize a steam chamber to pre-heat a food substrate prior to cooking or baking in an oven chamber. Such steam chambers typically operate at about 190° F. (about 88° C.) at the inlet to about 250° F. (about 120° C.) at the discharge end of the chamber. This is due to cold air and hot air infiltration effects occurring at the inlet and discharge respectively. As a result, the conditions in the steam chamber never reach saturation or even close to it. Therefore, at partially saturated conditions this chamber, which relies on condensation of water vapor onto the surface of the food substrate or work-piece to affect a rise in core temperature of the work-piece, is rather limited in available energy for transfer. Furthermore, such systems have performance limitations and process variations due to conditions prevailing upstream of the oven and/or outside room environment. Left uncontrolled these conditions can have a significant impact on cooking performance. These variations will have adverse effects on the heat transfer performance at initial and the most crucial stage of a cooking process thereby producing inconsistent product output which may lead to increased standard deviation of product temperatures across the belt width of a continuous system.

When fully saturated steam is introduced to a conventional steam chamber positioned at the inlet of an open continuous oven, the steam (i.e., the saturation level) is affected by air and/or vapor infiltrating from outside of the oven as well as process air migrating from the oven into the steam chamber. The amount air and/or vapor that migrates from the oven into the steam chamber is dependent upon the pressure differential at the interface between the oven and the steam chamber. Circulation fans in the oven typically produce a positive pressure differential between the oven and the steam chamber which may cause a hot air/vapor mixture to migrate from the oven into the steam chamber. The influx of the air/vapor mixture into the steam chamber thereby causes the steam to assume a partially saturated condition. The induced pressure differential is influenced by the relative operating conditions (i.e., temperature, fan speed and humidity) between the oven and the steam chamber. A small change in the steam saturation level within the steam chamber may result in relatively large changes in temperature across the belt width within the steam chamber and can result in non-uniform heating of the food item.

Air/vapor infiltration into the steam chamber increases the amount of air within the steam chamber to produce a partially saturated condition. This causes the effective heat transfer delivery rate to the product to be reduced and therefore increases the time needed to achieve a desired core temperature (dwell time). Increased dwell time of a food item within the steam chamber and through the entire cooking process will result in reduced product yields and throughput and increase operating costs. Additionally, air/vapor infiltration may cause inconsistent and/or variable condensation heating which will be detrimental to achieving desired product quality attributes and may pose food safety concerns.

Commercial food producers generally adjust for non-uniform heating by over-cooking food items. Typically, food items will be cooked longer at higher humidity or higher temperatures to ensure that minimum cooking temperatures are achieved within the largest food item on nay given batch on a continuous basis to insure food safety. However, cooking at higher temperatures than necessary combined with longer heating times may produce poor product quality and reduce throughput and yield.

SUMMARY OF THE INVENTION

Therefore it is one feature of the invention to provide a cooking apparatus including an open atmospheric steam chamber equipped with features to improve steam containment to achieve saturated steam temperatures up to about 212° F. (about 100° C.) while connected to an oven. This improved steam chamber is defined herein as a rapid activation module for use with a continuous oven that provides more uniform, consistent and improved condensation heating within this chamber section or zone.

It is a further feature of the invention to provide a cooking apparatus including a rapid activation module which can achieve and maintain a saturated steam atmosphere within a steam chamber.

Another feature of the invention is to provide a cooking apparatus including a steam chamber that is adaptable to various types of ovens, processing treatments and/or substrates.

An additional feature of the invention is to deliver lower overall process deviation with more consistent product quality attributes and improved product throughput.

In one embodiment, a cooking apparatus includes a rapid activation module in communication with a continuous oven, the rapid activation module including a steam chamber and a plurality of steam knives disposed at select positions within the stream chamber to achieve a select level of steam condensation.

In another embodiment, a cooking apparatus includes a rapid activation module in communication with a continuous oven, the rapid activation module including a chamber having an inlet and an outlet and including a first inclined portion having a first end adjacent the inlet and a second horizontal portion extending within the chamber from a second end of the inclined section to the outlet; a first exhaust stack positioned adjacent to the inlet; a second exhaust stack positioned adjacent to the outlet; a first steam knife disposed within in the chamber between the first and second exhaust stacks; and a second steam knife disposed within the chamber between the second exhaust stack and the outlet; wherein the first and second steam knives are positioned parallel to each other to maintain a select level of steam condensation within the chamber.

In a further embodiment, a rapid activation module in communication with a continuous oven includes a steam chamber having an inlet and an outlet; a first exhaust stack positioned adjacent to the inlet; a second exhaust stack positioned adjacent to the outlet; a first steam knife disposed within the steam chamber between the first and second exhaust stacks; a second steam knife disposed within the steam chamber between the first steam knife and the second exhaust stack; a third steam knife disposed between the second exhaust stack and the outlet; and a conveyor belt extending from the inlet through the steam chamber through the outlet and through an associated oven; wherein the second and third steam knives are positioned parallel to one another to maintain a select level of steam condensation within the steam chamber.

A method for cooking food products within a cooking apparatus includes the steps of passing a plurality of food products through a rapid activation module, heating the food products to a select core temperature within the rapid activation module, and transferring the heated food products to a continuous oven to complete cooking the food products, wherein the rapid activation module contains a saturated steam atmosphere at a temperature of about 200° F. to about 212° F. (about 95° C. to 100° C.) which is maintained by a plurality of steam knives disposed within a steam chamber of the rapid activation module. The method may further include the steps of adjusting the vertical and/or angular position of one or more steam knives within the rapid activation module to maintain the desired temperature and saturation of the steam.

Other features and advantages of the invention will be apparent to those skilled in the art from the following detailed description take in conjunction with the appended claims and drawings.

DETAILED DESCRIPTION OF THE INVENTION

In cooking or pre-heating processes involving humidity, moisture condenses on the surface of the food items. The energy delivered to the surface occurs through the change of phase in the steam. This energy subsequently migrates to the core of the food item through conduction. This translates to a corresponding increase in the internal core temperature of the food item. The thicker and/or drier the food item, the longer it will take to reach a steady state core temperature. Also affecting the time to reach steady state is the composition of the substrate. Also, the greater the amount of steam available for condensing, the larger the rise in core temperature of a given food item.

A cooking apparatus according to the present invention includes a rapid activation module in communication with a continuous oven. Food items to be cooked are passed through the rapid activation module into the continuous oven, suitably by a continuous conveyor. The rapid activation module includes a stream chamber having an inlet and an outlet and a plurality of steam knives disposed within the steam chamber at select positions. Suitably, the steam knives are disposed within the steam chamber in a manner that reduces and/or eliminates infiltration of outside air and/or vapor into the steam chamber.

The rapid activation module prepares the atmosphere for a work-piece or food item to achieve a rapid temperature rise by maximizing condensation prior to transfer to a subsequent step in a cooking process. The rapid temperature rise is achieved by maintaining a select level of steam condensation, suitably a fully saturated steam atmosphere, within a steam chamber of the rapid activation module. Advantageously, the level of steam condensation within the steam chamber may be controlled and/or adjusted relative to the type of substrate or food item to be heated.

The level of steam condensation within the steam chamber may be controlled or adjusted by delivering steam at a delivery pressure of about 20 to about 80 psig (about 138 to about 500 kPa) and/or at a flow rate of about 400 to about 1000 pounds per hour (about 180 to about 455 kg/hr.). Advantageously, the saturated steam temperature within the rapid activation module is maintained between about 204° F. and about 212° F. (about 95 to about 100° C.). The required steam flow rate is a function of the product throughput, substrate heat absorption rate, desired temperature setting in the steam chamber and the length of the rapid activation module in relation to the adjacent continuous oven. The temperature may be set at the highest achievable saturated steam temperature below 212° F. (100°) to prepare for the next step in the cooking process without compromising the final product quality. The optimum temperature for energy transfer and product quality may be determined empirically based on the type of substrate and/or food item being prepared.

Figure 1:
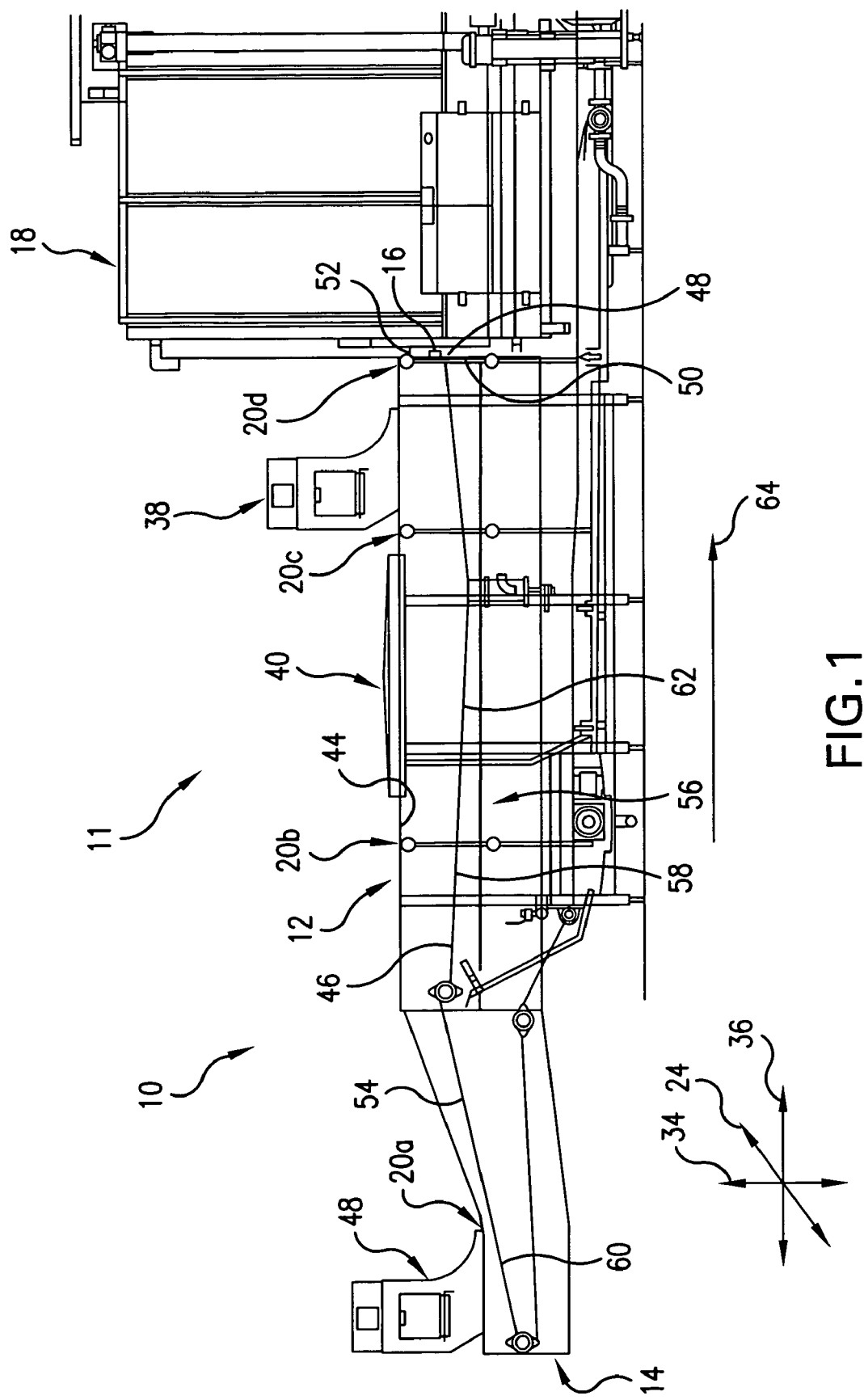
FIG. 1 is a schematic view of a cooking apparatus according to one embodiment of this invention.

Referring to FIG. 1, a cooking apparatus 11 includes a rapid activation module 10 in communication with a continuous oven 18. The rapid activation module 10 includes a steam chamber 12 having an inlet 14 and an outlet 16. The rapid activation module 10 is suitable for use with the continuous oven 18 such as, for example, a linear oven, a spiral oven, a contact cooker, a multi-tier spiral oven or an infrared oven. The rapid activation module 10 further includes a plurality of steam knives 20 disposed within the steam chamber 12. Four steam knives, 20a, 20b, 20c and 20d, are depicted in the FIG. 1. However, the rapid activation module 10 may include fewer or more steam knives 20 depending upon the desired cooking attributes. For example, the rapid activation module may include 2, 3 or 4 or more steam knives 20 disposed at select positions within the steam chamber 12.

Figure 2:
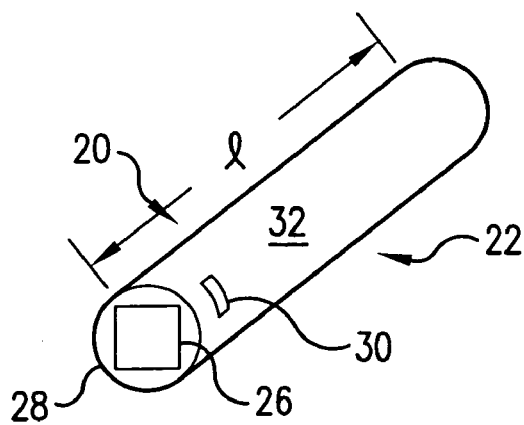
FIG. 2 is a schematic view of a steam knife for use in a rapid activation module.

Referring to FIG. 2, a steam knife 20 may include a tube 22 which is positioned to extend across a width 24 of the steam chamber 12. Suitably, tube 22 may have any desired cross-section such as, for example, circular, square or oval. In certain embodiments, the inner cross section 26 and the outer cross section 28 of the tube 22 may be different. For example, tube 22 may have a circular outer cross section 28 and a square inner cross section 26. The steam knife 20 includes one or more slits 30 formed in a wall 32 of tube 22 to allow steam to escape. The slits 30 may be disposed in select positions along the length (l) of the tube which extends across a width 24 of steam chamber 12.

Figure 3A:
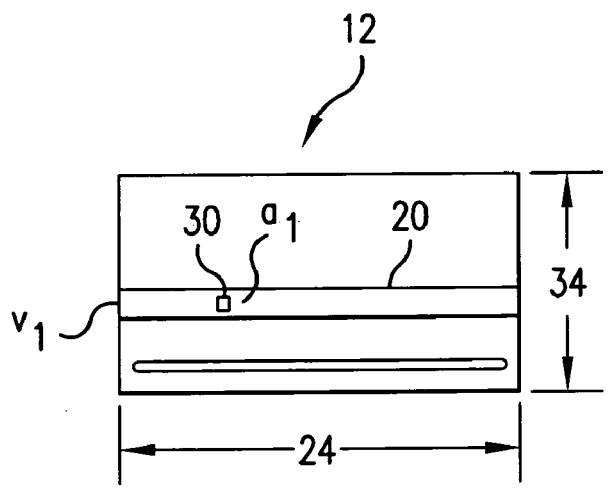
FIGS. 3a and 3b are schematic views of vertical and angular positions of a steam knife within a steam chamber of a rapid activation module.
Figure 3B:
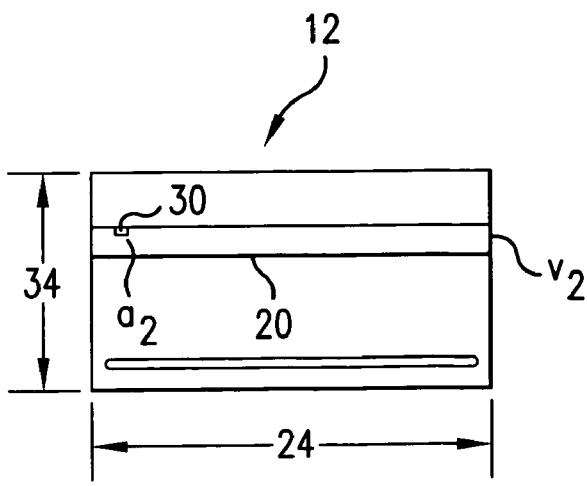
Figure 4A:
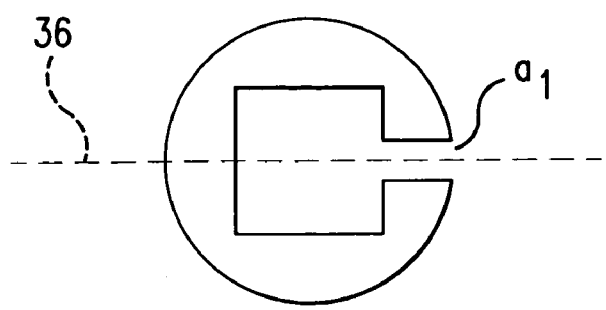
FIGS. 4a-4c are end views of the steam knife of FIG. 2 depicting various angular positions of the steam knife.
Figure 4B:
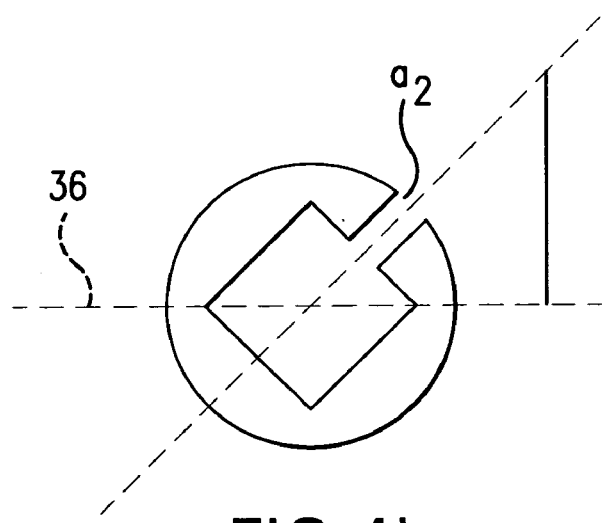
Figure 4C:
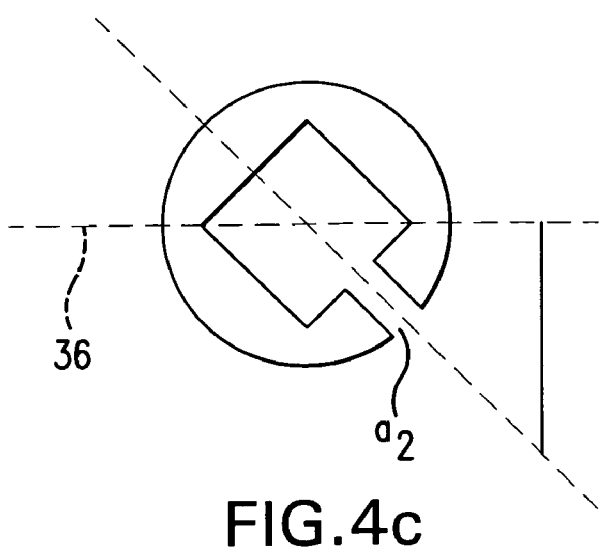

Advantageously, the positioning of individual steam knives 20 may be adjustable to accommodate a variety of food items and/or substrates such as, for example, beef, pork, poultry and bakery items. Referring to FIGS. 3a and 3b, one or more of the steam knives 20 may be adjustable between a first vertical position ($v_1$) and a second vertical position ($v_2$) along a vertical axis 34 of steam chamber 12. Additionally or alternatively, one or more individual steam knives 20 may be adjustable between a first angular position ($a_1$) and a second angular position ($a_2$). As shown in FIGS. 4a-4c and as used herein, an angular position is defined as a position of a steam knife that forms an angle between a horizontal axis 36 and a slit 30 of steam knife 20. Generally, one or more steam knives may have an angular position that is adjustable between −90° to 90° from horizontal axis 36. Suitably, a steam knife 20 may be adjustably rotated to form any desired angle between the steam knife 20 and the horizontal axis 36.

In one embodiment, the one or more individual steam knives 20 may be configured such that slit 30 runs across the full width of the rapid activation module (not shown). Such a slit 30 may be made in the tube 22 via a precision laser cut.

The rapid activation module 10 may include a process control system 66 for selectably controlling operating conditions within the steam chamber 12 depending upon a substrate of a food item. Different food substrates such as, for example, poultry, beef, pork and bakery items, may require very specific treatments, which can vary significantly depending upon the substrate, to deliver the sensory attributes (i.e., color, texture, consistency, flavor, etc.) desired by consumers. Suitably, the process control system 66 may selectably adjust at least one of a vertical position, an angular position or a steam delivery pressure of at least one steam knife 20.

The rapid activation module may include one or more exhaust stacks. Referring again to FIG. 1, the rapid activation module includes at least one exhaust stack 38 positioned adjacent to outlet 16 of steam chamber 12. Advantageously, a first steam knife 20c is positioned between the inlet 14 and the exhaust stack 38 and a second steam knife 20d is positioned between the exhaust stack 38 and the outlet 16. Steam knives 20c and 20d may be positioned parallel to one another to form a double seal between the outlet 16 and the main body 40 of the steam chamber 12. Suitably, steam knives 20c and 20d are positioned in steam chamber 12 such that slits 30 in knives 20c and 20d direct steam generally toward the exhaust stack 38 and outlet 16, respectively. Knife 20d utilizes steam flow to push any air or vapor escaping oven 18 back toward the oven through outlet 16. Knife 20c utilizes steam flow to push any air or vapor which may leak past knife 20d toward exhaust stack 38. Suitably, steam knives 20c and 20d may be adjusted in concert to isolate the main body 40 of the steam chamber 12 for air/vapor infiltration from the oven 18.

The rapid activation module may further include an exhaust stack 42 positioned adjacent to the inlet 14 of the steam chamber 12. Suitably, at least one steam knife 20a is positioned adjacent to exhaust stack 42 between exhaust stack 38 and exhaust stack 42. Steam knife 20a is advantageously adjusted to reduce or eliminate air infiltration from the inlet 14 into the main body 40 of the steam chamber 12.

The rapid activation module may additionally include a steam knife 20b positioned between steam knife 20a and steam knife 20c to further isolate the main body 40 of the steam chamber 12 from air or vapor infiltration from the oven 18 and/or the outside environment via inlet 14. Additional steam knives may be disposed in select positions within the steam chamber 12 to provide the desired level of steam and/or further enhance isolation of the main body 40 from air/vapor infiltration.

The steam knives may be adjusted such that steam flow from the steam knives 20 may directly or indirectly impinge upon air and/or vapor. Advantageously, the angular position of the steam knives may be adjusted to direct steam flow toward an upper interior surface 44, a lower interior surface 46 or an end interior surface 48 of the steam chamber 12. The end interior surface 48 of the steam chamber 12 may be provided by an end wall 50 of the steam chamber 12 or by a gate 52 positioned adjacent to a steam knife 20. Advantageously, the gate 52 may be raised or lowered from a first vertical position to a second vertical position to adjust a size of an opening between the upper interior surface 44 and the lower interior surface 46 of steam chamber 12.

One or more of the steam knives 20 may include a regulator (not shown) to adjustably set steam delivery pressure and or flow. Suitably, steam delivery pressure and/or flow may be selectably adjusted by the same process control system 66 which selectably adjusted the vertical height and/or angular position of one or more of the individual steam knives 20.

The rapid activation module 10 may include a transport mechanism, such as, for example, a conveyor belt 54, to move a batch of food items through the steam chamber 12. Suitably, the conveyor belt 54 which extends through steam chamber 12 from the inlet 14 to the outlet 16 may form the lower interior surface 46 of steam chamber 12. Advantageously, the space 56 beneath an upper run 58 of conveyor belt 54 is closed thereby further isolating the steam chamber 12 from the exterior atmosphere. In certain embodiments, the speed of the conveyor belt 54 may be controlled by the same process control system that selectably adjusts the operating conditions of the steam knives 20.

Suitably, the conveyor belt 54 may include a first inclined portion 60 extending from the inlet 14 into the main body 40 of the steam chamber 12. The conveyor belt 54 further include second portion 62 extending through the main body 40 of the steam chamber 12 to the outlet 16. The second portion 62 of the conveyor belt 54 may be a flat, linear run (i.e., horizontal) or may include a hump which increases a vertical elevation of the conveyor belt 54 or a dip which decreases a vertical elevation of the conveyor belt 54 over a select distance along conveyor path 64.

A computer or process control system 66 may be provided to control the speed of the conveyor belt 54, the temperature, humidity and/or velocity of the air within the continuous oven 18 as well as the angular and/or vertical position of the steam knives, the temperature and/or steam saturation level within the rapid activation module 10. The computer or process control system 66 may monitor various parameters within the cooking system 11 via a plurality of sensors disposed throughout the cooking system.

Figure 5:
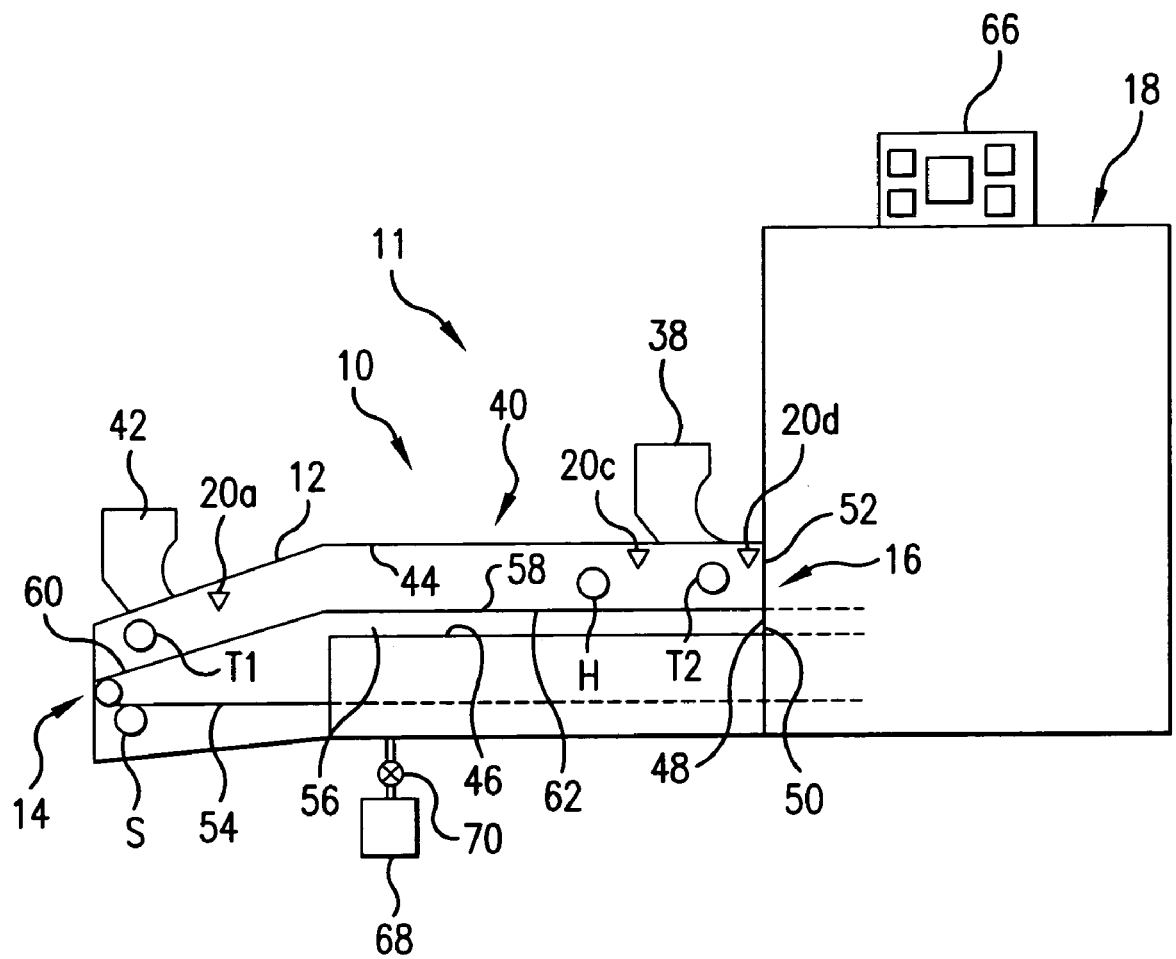
FIG. 5 is a schematic view of a cooking apparatus according to an additional embodiment of the invention.

For example, referring to FIG. 5, the computer or process control system 66 may monitor the speed of the conveyor belt 54 via sensor S and/or the initial food temperature, final food temperature and the humidity level within the rapid activation module 10 via sensors T1, T2 and H, respectively. Additional sensors (not shown) may be disposed with in the continuous oven 18 to monitor the cooking parameters within the continuous oven. Accordingly, the computer or process control system 66 is capable of controlling the cooking process within the cooking apparatus 11 to achieve a desired core temperature rise within food products passing through the rapid activation module 10 at a faster dwell time relative to current state of the art cooking systems.

The computer or process control system 66 may suitably run or execute a process control program such as described in commonly assigned U.S. Pat. No. 6,410,066, which is hereby incorporated herein by reference. The computer or process control system 66 will execute the process control program to both start the cooking apparatus 11 and then control the apparatus to maintain the cooking parameters and process conditions at or near their predefined values during the entire cooking process. Prior to starting the cooking apparatus 11, a user may manually adjust select components such as, for example, temperature and/or conveyor speed, depending upon the type of food products to be cooked.

In an exemplary embodiment of the invention as shown in FIG. 5, the rapid activation module 10 may include a steam generator 68, a valve 70 for controlling the flow of steam from the steam generator into the steam chamber 12 and a pressure regulator (not shown) for maintain the pressure of the steam regardless of pressure fluctuations within the steam generator 68. Suitably, the computer or process control system 66 may control the steam generator 68 and/or the valve 70 to maintain the steam at the desired temperature and saturation level within the rapid activation module 10.

The operating parameters of the cooking apparatus 11 will depend upon the requirements of a given application, such as the final end point temperature and desired food attributes. The following Table lists some exemplary operating parameters for fully cooking bone-in and boneless poultry based food products.

TABLE

| Process Conditions | Bone-In | Boneless |
|---|---|---|
| Steam Chamber Temp. (° F.) | 208–212 | 208–212 |
| Steam Chamber Integrated Average Temp. (° F.) | 209 (nominal) | 209 (nominal) 210 (optimal) |
| Continuous Oven Temp. (° F.) | 300–400 (nominal) | 390 (nominal) 350–375 (optimal) |
| Continuous Oven Humidity (% MV) | 70–90 (nominal) | 75–85 (nominal) 85 (optimal) |

Advantageously, use of the rapid activation module 10 of the present invention with continuous oven 18 may result in improvements in throughput and product yield of food items. For example, throughputs for cooking systems including rapid activation module 10 may increase by about 10% for poultry, beef, pork and bakery items and may increase by about 1% for poultry. Additionally, subsequent browning of food items processed in the rapid activation module may be improved resulting in lower cooking system operating costs.

While in the foregoing specification this invention has been described in relation to certain preferred embodiments thereof, and many details have been set forth for purposes of illustration, it will be apparent to those skilled in the art that this invention is susceptible to additional embodiments and that certain of the details described herein can be varied considerably without departing from the basic principles of the invention.

I claim:

1. A cooking apparatus, comprising:
a rapid activation module in communication with a continuous oven, the rapid activation module including a steam chamber having an inlet and an outlet, a main body between the inlet and outlet, a conveyor, and a plurality of steam knives disposed within the steam chamber;
wherein the plurality of steam knives are formed as a plurality of slits disposed and adjusted in select positions within the steam chamber to achieve a select level of steam condensation and to isolate the main body from air infiltration from the inlet and outlet;
and at least one gate positioned adjacent at least one steam knife.

2. The cooking apparatus of claim 1, wherein one or more steam knives is adjustable between a first vertical position and a second vertical position.

3. The cooking apparatus of claim 1, wherein one or more steam knives is adjustable between a first angular position and a second angular position.

4. The cooking apparatus of claim 1, further comprising a process control system for selectably controlling operating conditions within the steam chamber depending upon a substrate of a food item.

5. The cooking apparatus of claim 4, wherein the process control system selectably adjusts at least one of a vertical position, an angular position or a steam delivery pressure of at least one steam knife.

6. The cooking apparatus of claim 1, further comprising an exhaust stack disposed adjacent the outlet of the steam chamber.

7. The cooking apparatus of claim 6, wherein a first steam knife is positioned between the inlet and the exhaust stack and a second steam knife is positioned between the exhaust stack and the outlet.

8. The cooking apparatus of claim 7, wherein the first and second steam knives are positioned parallel to one another.

9. The cooking apparatus of claim 1, wherein the at least one gate is adjustable between a first vertical position and a second vertical position.

10. A cooking apparatus, comprising:
a chamber having an inlet and an outlet, a main body between the inlet and outlet, a conveyor, and including a first inclined portion having a first end adjacent the inlet and a second horizontal portion which extends within the chamber from a second end of the inclined portion to the outlet, the chamber in communication with a continuous oven;
a first exhaust stack positioned adjacent to the inlet;
a second exhaust stack positioned adjacent to the outlet;
a first steam knife disposed within the chamber between the first and second exhaust stack; and
a second steam knife disposed within the chamber between the second exhaust stack and the outlet;
wherein the first and second steam knives are formed as slits positioned and adjusted to maintain a select level of steam condensation within the chamber and to isolate the main body from air infiltration from the outlet;
and at least one gate positioned adjacent at least one steam knife.

11. The cooking apparatus of claim 10, wherein the first and second steam knives are adjustable between a first vertical position and a second vertical position.

12. The cooking apparatus of claim 10, wherein the first and second steam knives are adjustable between a first angular position and a second angular position.

13. The cooking apparatus of claim 10, further comprising a transport mechanism extending from the inlet through the steam chamber to the outlet, the transport mechanism for moving a batch of food items through the steam chamber to an associated continuous oven.

14. The cooking apparatus of claim 13, wherein the transport mechanism comprises a conveyor belt.

15. A rapid activation module in communication with a continuous oven, comprising:
- a steam chamber having an inlet and an outlet, and a main body between the inlet and outlet;
- a first exhaust stack positioned adjacent to the inlet;
- a second exhaust stack positioned adjacent to the outlet;
- a first steam knife positioned adjacent to the first exhaust stack between the first and second exhaust stack;
- a second steam knife positioned adjacent to the second exhaust stack between the first steam knife and the second exhaust stack;
- a third steam knife positioned adjacent to the second exhaust stack between the second exhaust stack and the outlet; and
- a conveyor belt extending from the inlet through the steam chamber to the outlet;
- wherein the steam knives are formed as slits and the second and third steam knives are positioned and adjusted to maintain a select level of steam condensation within the steam chamber and to isolate the main body from air infiltration from the outlet;
- and at least one gate positioned adjacent at least one steam knife.

16. The rapid activation module of claim 15, wherein at least one of the steam knives is adjustable between a first vertical position and a second vertical position.

17. The rapid activation module of claim 15, wherein at least one of the steam knives is adjustable between a first angular position and a second angular position.

18. The rapid activation module of claim 15 further comprising a process control system for adjusting at least one of a vertical position, an angular position or a steam delivery pressure of at least one of the steam knives to selectably control operating conditions within the steam chamber depending upon the substrate of a food item.

19. The rapid activation module of claim 18, wherein the process control system further adjusts a speed of the conveyor belt.

* * * * *

UNITED STATES PATENT AND TRADEMARK OFFICE
CERTIFICATE OF CORRECTION

| | |
|---|---|
| PATENT NO. | : 7,798,059 B2 |
| APPLICATION NO. | : 11/483908 |
| DATED | : September 21, 2010 |
| INVENTOR(S) | : Ramesh M. Gunawardena |

It is certified that error appears in the above-identified patent and that said Letters Patent is hereby corrected as shown below:

On the title page, and col. 1, line 1, in the title (54), "STREAM" should be changed to --STEAM--.

Signed and Sealed this

Thirtieth Day of November, 2010

David J. Kappos
*Director of the United States Patent and Trademark Office*